Sept. 19, 1961    E. J. ALM    3,000,615
TIRE SPREADER AND INVERTER

Filed Sept. 2, 1958    3 Sheets-Sheet 1

Inventor
ERHARD J. ALM
by: *Douglas S. Johnson*
 *atty*

Sept. 19, 1961  E. J. ALM  3,000,615
TIRE SPREADER AND INVERTER
Filed Sept. 2, 1958  3 Sheets-Sheet 2

Inventor
ERHARD J. ALM
by: *Douglas S. Johnson*
    atty

Sept. 19, 1961 E. J. ALM 3,000,615
TIRE SPREADER AND INVERTER
Filed Sept. 2, 1958 3 Sheets-Sheet 3
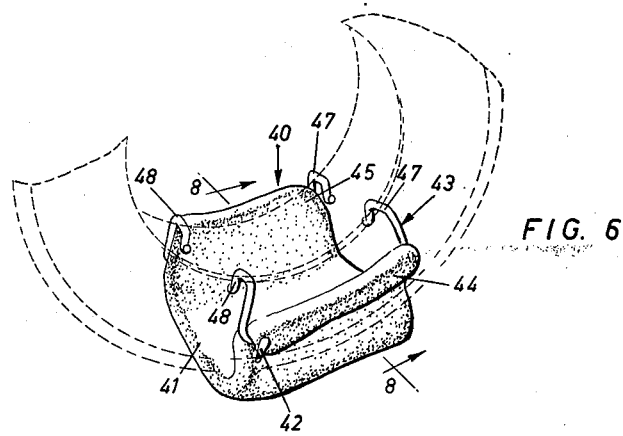
FIG. 6
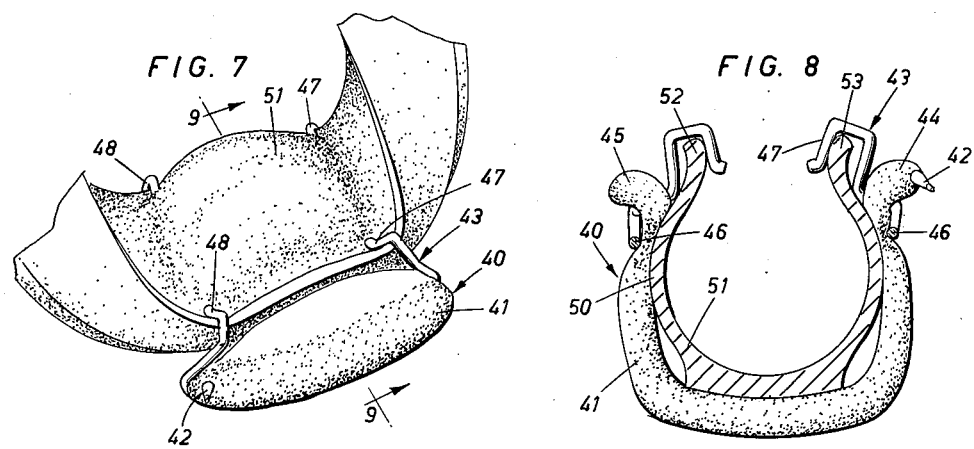
FIG. 7
FIG. 8
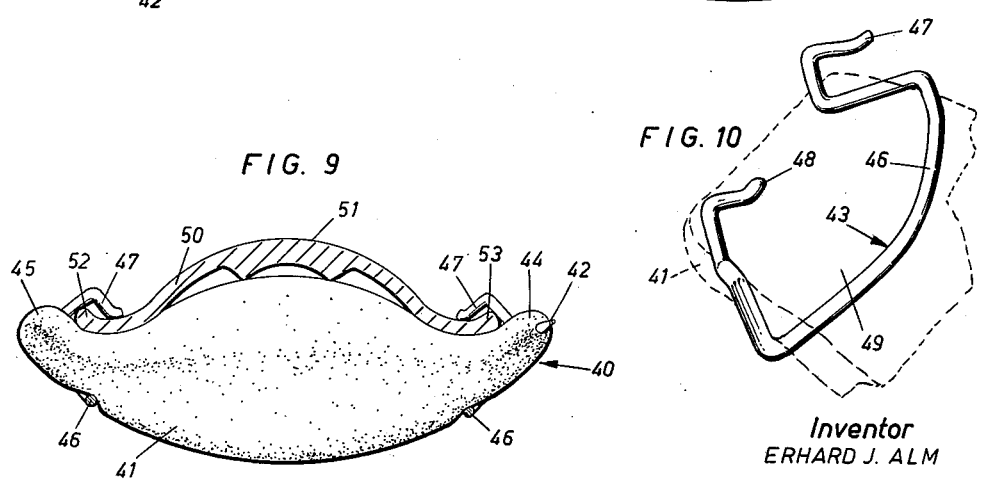
FIG. 9
FIG. 10
Inventor
ERHARD J. ALM
by:

United States Patent Office 3,000,615
Patented Sept. 19, 1961

3,000,615
TIRE SPREADER AND INVERTER
Erhard J. Alm, Toronto, Ontario, Canada, assignor to Vulcan Equipment Co. Ltd., Toronto, Ontario, Canada
Filed Sept. 2, 1958, Ser. No. 758,506
10 Claims. (Cl. 254—50.3)

This invention relates to improvements in apparatus for spreading and inverting a transverse section of a tire casing in a repair operation.

Numerous devices are now on the market for inverting a tire casing section, the most common type comprising an air or hydraulically operated piston and cylinder apparatus having a head formation and associated hooks for engaging over the bead portions of the tire casing walls at opposite sides, the head portion being adapted to be forced in the direction of the axis of the tire casing to substantially invert it.

The inverted section produced by this apparatus is not uniform in that adjacent to the tire casing bear portions an indentation or trough is formed. It will be appreciated that the repair of a tire casing will include skiving, buffing and inlaying operations which cannot satisfactorily be carried out in the region of the trough formations. Any repair, therefore, in this region, may prove to be unsound.

It will also be appreciated that the trough formation formed with the piston and cylinder apparatus may permanently damage the tire wall.

The principal object of this invention is to provide an apparatus for spreading and inverting a tire casing section from bead to bead, eliminating any trough formation adjacent to the bead portions, in order that a tire repair operation can be carried out at any point in the casing wall, to specification.

Another very important object is to provide an apparatus of simple construction as compared with the piston and cylinder apparatus, which is light in weight and, therefore, readily transportable and for which maintenance costs are negligible.

Another important object of this invention is to provide an apparatus which can be used to spread and invert tire casings of various sizes and particularly it is of special significance that an apparatus constructed in accordance with this invention can be used to spread and invert truck and tractor casings which heretofore has not been practical.

It is also an object to provide an apparatus as aforesaid which can be manufactured and sold very much more cheaply than devices now available.

The principal feature of this invention resides in providing a tire spreader and inverter comprising the combination of an inflatable, planar bag having an extent to conform substantially completely around the outer periphery of a section of a tire casing at a position where a repair operation is to be carried out, the inflatable bag having associated hook formations which engage over the tire bead portions at opposite sides to clamp the air bag and casing against separation, the bag under inflation extending itself outwardly to spread the bead portions while centrally it takes up a pillow-like configuration moving upwardly against the tire casing tread and walls to substantially completely invert the section.

More particularly, the tire spreader and inverter according to this invention comprises a platform member having upwardly extending hinged wall members at opposite sides with a hook formation mounted adjacent to each of the upper ends of the aforesaid walls and depending inwardly to engage over and clamp the beads of a tire casing to be placed therebetween, the surfaces of the platform and walls being overlain with a planar inflatable bag conforming to the platform and walls throughout their extent, the action of the air bag under inflation extending itself to force the hinged wall members outwardly and thereby spread the bead portions of the tire casing.

Still another important feature of this invention results from the aforesaid arrangement in that a tire casing will take upon itself a substantially completely inverted and self-sustaining configuration when urged into substantially complete inversion there being defined between the inverted tire section and inflatable bag an air space, contact being maintained between the tire casing and bag only at points adjacent to the beads, the spacing defined thereby enabling the skiving or buffing operation to be undertaken completely through the casing without damage to the tools or to the bag.

Another feature of this invention resides in providing in combination with the support structure as aforesaid of an instantaneous release valve structure for the inflatable bag in order that the bag may be instantaneously deflated when the repair operation has been completed.

Still another feature of this invention resides in providing an over-center toggle device for each of the hook formations whereby tire casings over a range of sizes can be rigidly clamped.

These and other objects and features will become apparent on reading the following specification in conjunction with the sheets of drawings in which:

FIGURE 6 is a perspective view of a tire casing and a more simplified tire spreading and inverting apparatus constructed in accordance with the invention;

FIGURE 7 is a perspective view similar to FIGURE 6 but showing the apparatus in its inflated state;

FIGURE 8 is a vertical mid-sectional view along the line 8—8 of FIGURE 6;

FIGURE 9 is a vertical mid-sectional view along the line 9—9 of FIGURE 7; and

FIGURE 10 is a perspective view of a hook formation according to the embodiment of the invention as illustrated in FIGURE 6.

Figure 1:
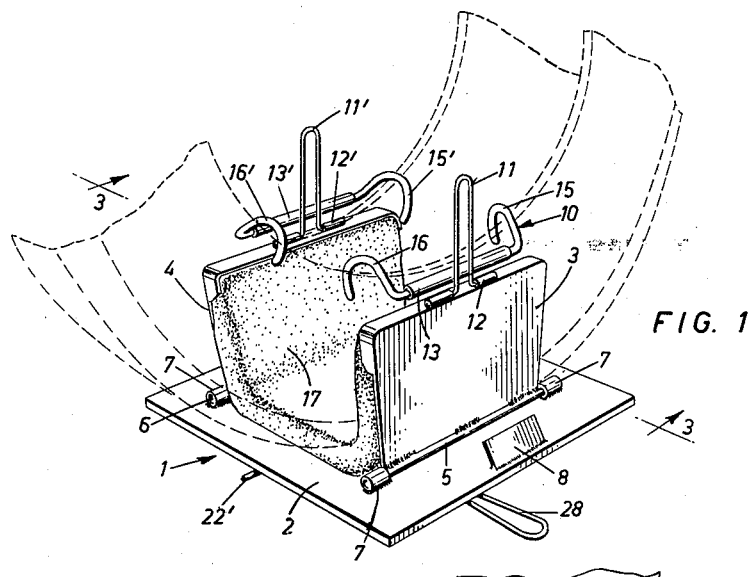
FIGURE 1 is a perspective view of the tire spreading and inverting apparatus constructed in accordance with the invention.
Figure 2:
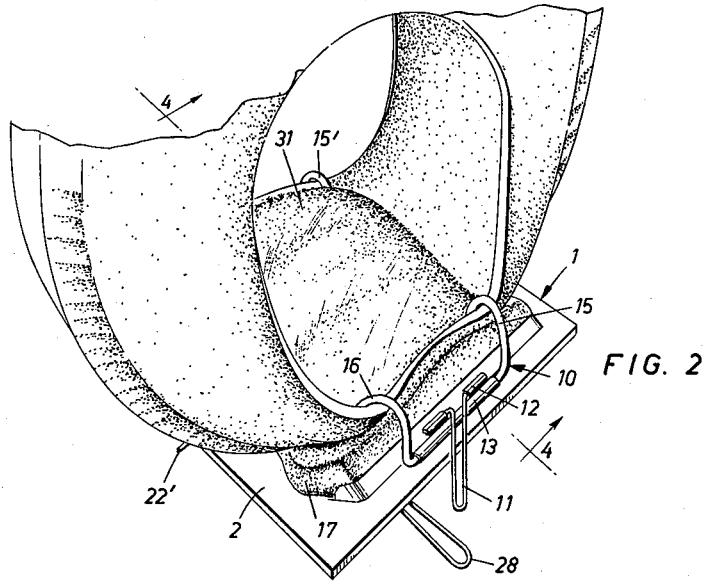
FIGURE 2 is a perspective view partly broken away showing the apparatus applied to a tire casing with the bag inflated to invert the casing wall.

With reference to FIGURES 1 and 2 of the drawings, the tire spreading and inverting apparatus generally designated at 1 comprises a platform member 2 upon which is mounted a pair of plate members or walls 3 and 4 in spaced parallel relation. The walls 3 and 4 are pivotally connected to the platform 2 by pivot rods 5 and 6, respectively, secured at their lower edges as by welding, the ends of the rods 5 and 6 engaging in opposed pairs of socket members 7 mounted on the platform 2.

Figure 4:
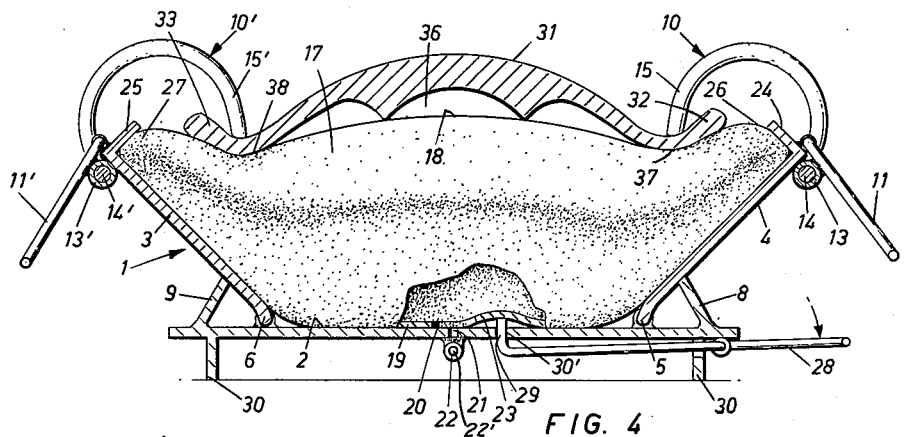
FIGURE 4 is a vertical mid-sectional view taken along the line 4—4 of FIGURE 2.

The walls 3 and 4 are spaced apart a distance to receive tire casings over a range of sizes, the walls 3 and 4 being swingable from an upwardly extending substantially vertical position as shown in FIGURE 1 to an inclined position as shown in FIGURES 2 and 4, platform 2 being provided with upstanding projections 8 and 9 on opposite sides to limit the inclination of walls 3 and 4, respectively.

Located at the upper edge of hinged wall members 3 and 4 are hook formations generally designated at 10 and 10', respectively, each comprising a handle member or arm 11 and 11', pivotally secured in opposed sockets 12 and 12', the handle having rigidly secured thereto at a point spaced from the pivot axis, a tubular member 13 and 13' to receive the central rod 14 and 14' connecting a pair of hook elements 15 and 15' and 16 and 16' which depend inwardly of the walls 3 and 4 for engaging over the bead portions of a tire section.

Figure 5:
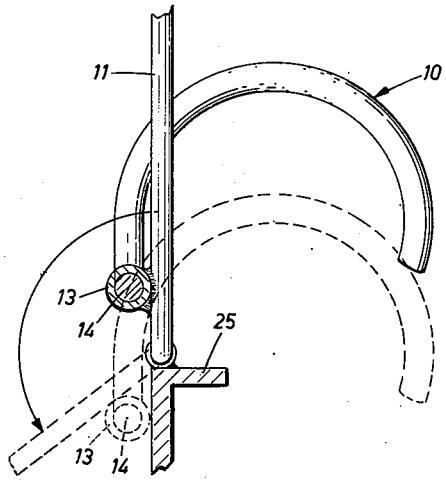
FIGURE 5 is a detailed view of a hook formation for rigidly clamping a tire casing in the apparatus.

In FIGURE 5, the hook formation 10 is illustrated to exhibit the off-set relation of tubular member 13 from the pivot axis of handle member 11, whereby an over-center toggle device is provided which arrangement acts to clamp and lock the hook formations 10 and 10' to their respective tire bead portions of a tire casing.

Extending down the walls, across the platform portion between the walls and up the wall 4 is a planar inflatable bag 17 which has a flexibility enabling it to conform itself to the outline of the walls and platform and has an area substantially registering with the surfaces presented by the walls and platform.

The bag formation comprises essentially a flattened rubber tube which is cut transversely at each end and sealed upon itself defining superimposed layers 18 and 19. Suitable fabric, preferably friction fabric, is vulcanized to the rubber tube to give it added strength and toughness.

An inflatable bag formed in this manner takes upon itself under inflation a pillow-like configuration which characteristic is utilized in the spreading and inverting of a tire section. Furthermore, it is the tendency with this inflatable article, as is the case of all inflatable articles, that the bag when inflated will assume its predetermined configuration.

The inflatable bag 7 may be provided with suitable valve means for inflating same, but, in accordance with the preferred embodiment of the invention, the lower wall 19 is provided with an aperture 20 centrally thereof which registers with an aperture 21 formed centrally of the platform 2 between the walls 3 and 4. The aperture 21 is connected to a conduit 22 mounted on the underside of platform 2 and which is provided with suitable valve means 22', for controlling the application of fluid pressure to and releasing the fluid pressure from the system.

The bag 17 under its own weight and in addition under the weight of the tire casing placed in the apparatus, seals the periphery 23 of aperture 20 against the surface of the platform to define a sealed system for inflation by way of conduit 22.

Figure 3:
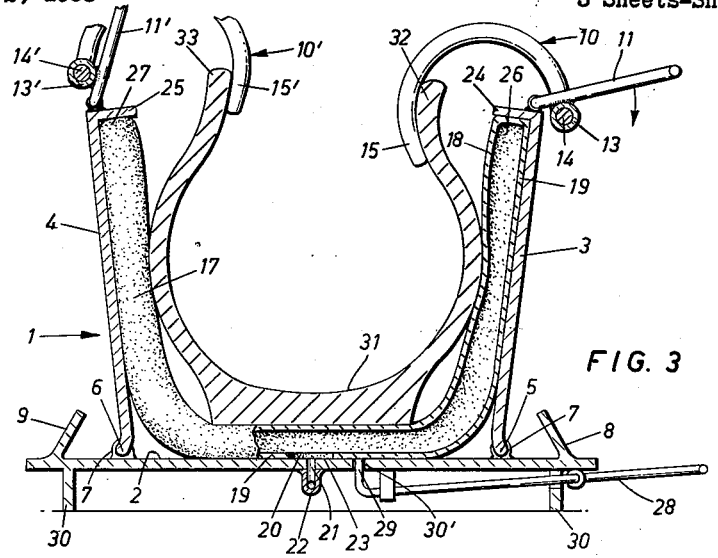
FIGURE 3 is a vertical mid-sectional view of the tire spreading and inverting apparatus of FIGURE 1 along the line 3—3 showing a tire casing mounted therein, prior to the spreading and inverting operation.

The upper edges of the walls 3 and 4 are each formed with a flange 24 and 25, respectively, to receive the ends 26 and 27, respectively of the bag 17 as appearing in FIGURE 3.

Located below the platform 2 is a base formation 30 through which a pivotally mounted lever member 28 extends, the inner end of the lever being upturned to provide a finger 29 which registers with an aperture in platform 2 as at 30'. The finger 29 is adapted to project through aperture 30' to contact and lift the periphery 23 of the aperture 20 formed in the bag wall 19, upon depression of the outer end of the lever 28 to break the seal and so deflate the inflated bag, providing an instantaneous release.

In commencing a repair operation a tire casing 31 is placed in the apparatus with that section of the casing which is to be repaired positioned between walls 3 and 4.

As best seen in FIGURES 3 and 4, the hook formations 8 and 9 are moved inwardly to engage over the bead portions 32 and 33 of the tire casing section and by depressing the handles 11 and 11' of hook formations 10 and 10', bead portions 32 and 33 are clamped by means of hooks 15 and 15' and 16 and 16' against the bag 17 and to the walls 3 and 4, respectively, against separation and relative displacement.

As air pressure is supplied to bag 17 through conduit 22, the ends of the bag 26 and 27 move outwardly to extend themselves until the walls 3 and 4 contact the projections 8 and 9 as will be seen in FIGURE 4.

Simultaneously, the upper wall 18 of the bag 17 is distended upwardly to assume a somewhat pillow-like configuration causing the section of the tire casing 31 to be deformed upwardly into a substantially completely inverted disposition. This action of the bag 17 in extending itself and taking upon itself a pillow-like configuration results in the simultaneous spreading and inverting of that section of a tire casing to provide a substantially uniform curvature of the tire casing wall from bead to bead so that repair operations can be undertaken, if need be, next adjacent to the bead portions.

With reference to FIGURE 2 it will be seen that the inverted section of the tire casing has a somewhat pillow-like configuration having an appreciable lateral extent. Also, with reference to FIGURE 4, it will be seen that in the fully inverted state a space 36 is defined between the tire casing and the inflated bag and that contact is maintained only at points 37 and 38 adjacent to the bead portions 32 and 33.

This phenomenon may be explained in that a tire casing has a certain inherent resiliency which takes upon itself a self-sustaining configuration when fully inverted.

This is an important advantage in that in a buffing or skiving operation it may be necessary to cut entirely through the casing in which case this may be done without damaging to the tools and without damage to the bag 17.

A more simplified embodiment of the invention is illustrated in FIGURES 6 to 10 inclusive in which the tire spreader and inverter apparatus generally designated at 40 comprises a planar inflatable bag formation 41, which, as in the case of the preceding embodiment, is preferably formed from an unvulcanized rubber tube cut transversely as at each end and sealed upon itself, the bag being subsequently vulcanized to a surrounding fabric sheeting of the friction type to provide a strong and durable construction.

A suitable valve connection 42 is provided for inflating and deflating the planar bag 41.

A pair of hook formations 43 each of which are identical, are adapted to secure the ends 44 and 45 of the bag 41 to the tire casing, the hook formations 43 each comprising a central rod portion 46 having two depending off-set hooks 47 and 48 one at each end. The hook formations 43 are adapted to receive the ends 44 and 45 of the bag 41 in the channel defined between the hooks 47 and 48 and the rod portion 46, as at 49.

The bag 41 is snugly conformed substantially completely around the section 50 of a tire casing 51 at the position where repair is to be undertaken, the hook formations 43 being adjustable along the length of the bag 41 to accommodate various tire sizes.

Hooks 47 and 48 of hook formations 43 are then secured over the bead portions 52 and 53, respectively of tire section 50 to clamp bag 41 and the tire section against separation and relative displacement under inflation.

As in the case of the preceding embodiment, the bag 41 under inflation tends to assume a pillow-like configuration. Accordingly, the ends 44 and 45 of bag 41 move outwardly under inflation while simultaneously the central portion expands into the pillow-like configuration to draw the bead portions 52 and 53 outwardly to spread the casing section 50 and to invert the casing section wall from bead to bead. Under full inflation the casing section wall assumes a substantially uniformly curved configuration as best seen in FIGURES 7 and 9, to expose the entire casing wall from bead to bead for a repair operation.

It will be understood that in this embodiment the lower wall of the bag 41 will have a rounded configuration which is unstable and will not support the casing in an upright position. However, the tire casing 51 and apparatus 40 can be placed in a suitable supporting frame or laid upon its side upon a work table.

It will be appreciated that various alterations and modifications in the invention as illustrated and described in this application may be undertaken by those persons skilled in the art without departing from the spirit and scope of the invention as defined in the appended claims.

What I claim is:

1. Apparatus for spreading and inverting a transverse section of a tire casing comprising a planar inflatable air bag having an extent to conform substantially around the outer periphery of a transverse tire casing section, channel-shaped adjustable platform means for adjustably conforming said air bag throughout its extent to a section of a tire casing throughout inflation of said bag and means for securing said air bag and adjustable platform means to a tire casing section against separation under the inflation of said air bag.

2. Apparatus according to claim 1 in which said adjustable platform means comprises a horizontal platform member having a pair of upstanding hinged plates at opposite sides, each being swingable from a substantially vertical position to an outwardly inclined position under the inflation of said bar.

3. Apparatus according to claim 2 in which said securing means comprises a toggle operated hook formation carried by each of said hinged plate members adjacent to its upper end and depending inwardly thereover to engage and clamp a tire bead portion at opposite sides of a tire casing section.

4. Apparatus according to claim 2 in which stop means are provided to limit the outward inclination of said plates.

5. A tire spreader and inverter comprising the combination of a channel-shaped platform having swingably adjustable side walls mounted on a support base, stop means for limiting the outward inclination of said adjustable side walls, a hook formation mounted on each of said adjustable side walls, said hook formation depending inwardly thereof, and an inflatable planar air bag extending over said channel-shaped platform.

6. An apparatus for spreading and inverting a transverse section of a tire casing comprising a base, a platform mounted on said base, a pair of aligned hingedly connected upwardly extending wall sections at opposite sides of said base, stop means for limiting the outward inclination of said wall section, a pivotal hook formation mounted adjacent to the upper ends of each of said wall sections and depending inwardly to engage over and clamp the bead portion of a tire casing section to be placed therebetween, an inflatable planar bag formation adapted to be mounted on said platform and extend upwardly at opposite sides to substantially register with said wall sections and valve means for said bag formation.

7. An appartaus according to claim 6 in which said platform comprises a planar member having a central aperture therethrough communicating with a conduit, valve means for said conduit, and said air bag having an aperture formed through one wall thereof which is arranged to register with said first-mentioned aperture, the periphery of said second-mentioned aperture being adapted to seal itself against said platform under the weight of a tire casing.

8. An apparatus according to claim 7 in which said platform member is provided with a second aperture therethrough adjacent to said first-mentioned aperture, a lever extending below said platform and presenting a finger at one end for operating through said second aperture whereby the seal between the periphery of said bag aperture and platform member is adapted to be broken.

9. An apparatus according to claim 6 in which each of said hook formations compirse a pair of spaced hooks pivotally connected to an arm, said arm being pivotally mounted at the upper ends of said platform to provide an over-center clamping action.

10. In an apparatus for the repair of tire casings, the combination of an inflatable bag and a platform member upon which said air bag is mounted, said platform member having aperture means formed therethrough, conduit means communicating with said aperture means and valve means for said conduit, said air bag having an aperture formed through one wall thereof and arranged to register with said first-mentioned aperture when said bag is mounted on said platform and means carried by said platform for breaking the seal between the second-mentioned aperture periphery and said platform.

References Cited in the file of this patent

UNITED STATES PATENTS

| | | |
|---|---|---|
| 2,525,114 | Branick | Oct. 10, 1950 |
| 2,766,006 | Kraft | Oct. 9, 1956 |